UNITED STATES PATENT OFFICE.

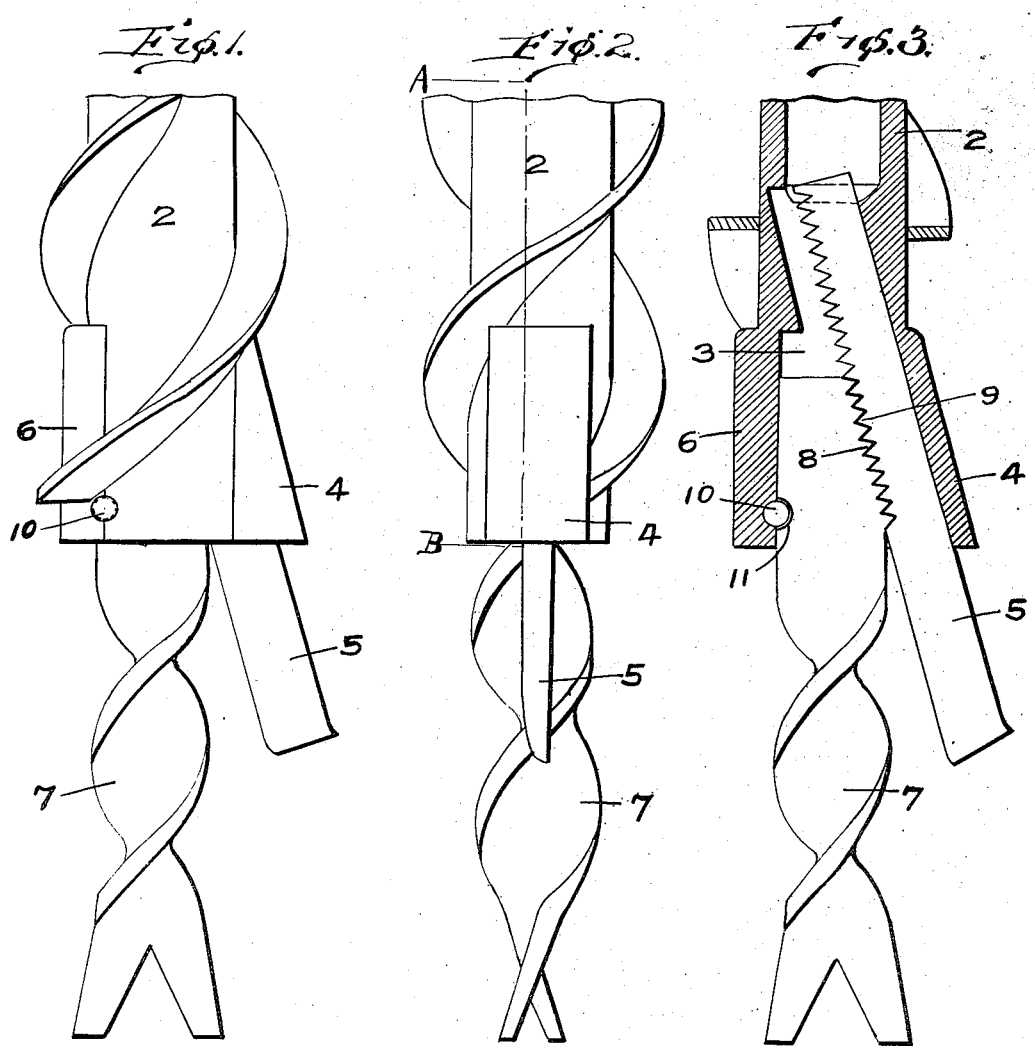

SAMUEL POPKY, OF WILKES-BARRE, PENNSYLVANIA.

EXTENDING AUGER.

1,010,314.  Specification of Letters Patent.  Patented Nov. 28, 1911.

Application filed October 2, 1909. Serial No. 520,740.

*To all whom it may concern:*

Be it known that I, SAMUEL POPKY, a citizen of the United States, residing at Wilkes-Barre, in the county of Luzerne and State of Pennsylvania, have invented certain new and useful Improvements in Extending Augers; and I do hereby declare the following to be a full, clear, and exact description of the invention, such as will enable others skilled in the art to which it appertains to make and use the same.

This invention relates to extending augers for boring or drilling holes of various diameters.

An object of the invention is to provide an extending auger with an extensible cutter that can be sharpened and re-sharpened until almost completely worn away.

A further object of the invention is to directly combine a bit and extensible cutter adapted to be positioned within a longitudinal socket formed in the shank of an auger.

With these and other objects the invention comprises certain novel constructions, combinations and arrangement of parts as will be hereinafter more fully described and claimed.

In the accompanying drawings: Figure 1 represents a side elevation showing the angle at which the extensible cutting member is positioned in relation to the bit. Fig. 2 is an edge elevation of the view shown in Fig. 1. Fig. 3 is a sectional view taken on line A—B of Fig. 2 showing the manner of connecting the bit and extensible cutter.

Referring to the drawings by numerals 2 represents a hollow auger shank having formed in the end thereof a rectangular longitudinal tapering socket 3 forming a continuation of the hollow shank 2 which is preferably circular in cross section above the socket 3 with the blades of the shank formed on the outside thereof. The shank 2 is preferably made of cast material with a tapering projection 4 made integral therewith, and adapted to have its inner walls engage the sides and back edge of the extensible cutter 5. Another projection 6 is carried by the shank 2 opposite the projection 4, the inner walls of which are adapted to engage the sides and back of one end of the bit 7. The bit 7 is provided with teeth 8 which interlock with teeth 9 positioned upon the extensible cutter 5. The bit 7 and cutter 5 are placed together with the teeth of the one engaging the teeth of the other, and then inserted in socket 3 as shown in Fig. 3, and locked in that position by means of a suitable pin or cotter 10 engaging the notch 11 formed in the edge of the bit 7, pin 10 passing through the walls of the shank to engage the bit and may be secured therein in any desired way.

The extensible cutter 5 is made long enough to permit of a considerable amount of wear and grinding so that it can be adjusted downwardly on the toothed portion of the bit 7, beyond which it extends inside of the socket 3, the extensible cutter 5 being positioned at a slight angle to the bit 7 and being adjustable to cut different sized holes.

What I claim is:—

In a device of the character described, an auger shank having a longitudinal tapering socket formed therein, a bit having a tapering end corresponding to the taper of the socket and provided with teeth on one edge, an adjustable cutting member having an edge provided with teeth adapted to engage the teeth of the bit, the cutter being adapted to extend with the bit at an acute angle by being positioned upon the tapered portion of the bit, and means for securing the bit within the socket to secure the cutter to the bit.

In testimony whereof I affix my signature in presence of two witnesses.

SAMUEL POPKY.

Witnesses:
W. J. TREMBATH,
JACOB POPKY.